3,444,151
STYRENE-MALEIC ANHYDRIDE-AMINE POLYMERS AS EMULSIFIERS IN POLYMERIZATION OF VINYL MONOMERS
Joseph A. Verdol, Dolton, and Hector J. Gonzalez, Hazel Crest, Ill., assignors to Sinclair Research, Inc., New York, N.Y., a corporation of Delaware
No Drawing. Filed Sept. 7, 1965, Ser. No. 485,620
Int. Cl. C08f 1/13
U.S. Cl. 260—86.7                                10 Claims

ABSTRACT OF THE DISCLOSURE

In the emulsion polymerization of polymerizable vinyl monomers in the presence of an emulsion polymerization catalyst, emulsifier and water at temperatures of about 0 to 100° C., the improvement which comprises employing as the emulsifier in the polymerization under acidic pH, the reaction product of a polymer of styrene and maleic anhydride having a styrene to maleic anhydride mole ratio of about 1 to 4:1 and an average molecular weight of at least about 400 and from about 0.1 to 2 moles of an amine per anhydride group in the styrene-maleic anhydride polymer. The amine can be, (A) a monoamine having the general formula:

wherein R is alkyl of about 5 to 25 carbon atoms and R' is hydrogen or R, or (B) a polyamine having the general formula:

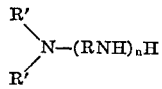

wherein R is alkylene of 2 to about 25 carbon atoms, $n$ is a number from 1 to about 10,000 and R' is hydrogen or hydrocarbon of 1 to about 30 carbon atoms. The emulsifier can be present in an amount of about 0.1 to 50 weight percent based on the vinyl monomers.

---

The present invention relates to the preparation of improved polymer emulsions using nitrogen derivatives of styrene-maleic anhydride polymers as the primary emulsifying agents and protective colloids for the polymerization of vinyl monomers. The outstanding properties of the polymer emulsions prepared in accordance with the present invention are small particle size, prolonged storage stability, freeze-thaw stability, mechanical stability, reproducible emulsion viscosities from batch to batch, and outstanding resistance to water and alkaline soaps and detergents when used in floor polish and coating formulations.

The polymer emulsions prepared in accordance with the present invention are of commercial value for the manufacture of floor polishes, emulsion paints, adhesives, paper coatings, textile sizes, etc. Emulsion paints and floor polishes prepared from these emulsions have outstanding water resistance and resistance to alkaline detergents. However, they have the added advantage of being removable by acidic materials, e.g., acetic acid, citric acid and other organic or inorganic acids, which is a desirable characteristic of floor polishes.

There has recently been increasing commercial interest in emulsion polymer coatings showing improved water resistance and resistance to degradation by alkaline detergents and soaps. Unfortunately, in many of the polymer emulsions manufactured today, emulsion stability is achieved by employing emulsifying agents and protective colloids which are readily solubilized by neutral and alkaline aqueous systems. Thus, when the emulsion polymers are used in floor polish or in other coating formulations, the resultant coating is readily penetrated by water and alkaline materials, which causes the polymer film to lose its gloss and other desirable physical properties. In many cases the polymer film is completely removed from its substrate.

Many attempts have been made to improve the hydrolytic stability of emulsion polymer coating formulations, while still providing a means for removing the coating from the substrate at such times when the coating has deteriorated through normal aging and wear. Most of the current emulsion polymers employed for this purpose are based upon the concept of utilizing a basic nitrogen containing monomer as part of the film-forming polymer backbone. For example, many so-called "acid sensitive" polymer emulsions are prepared by copolymerizing styrene with acrylic monomers such as diethylaminoethyl methacrylate or dimethylaminoethyl methacrylate. Other systems are based upon terpolymers containing styrene, a conventional acrylic monomer (e.g., methyl, ethyl, butyl methacrylate) and a basic nitrogen-containing monomer. Related systems employ basic nitrogen-containing maleic esters, itaconic esters, etc. In all these so-called "acid sensitive" emulsion systems, the acid sensitivity is derived through the incorporation of an "acid sensitive" polymerizable monomer as part of the film-forming polymer.

The "acid sensitive" polymers of the type described produce coatings which are much improved in stability towards water and alkaline materials; however, since the preparation of these polymer emulsions requires the use of relatively large amounts of emulsifiers (usually of the non-ionic or anionic type) they are still somewhat susceptible to degradation, spotting, or mottling by aqueous systems.

In accordance with the present invention polymer emulsions of greatly improved resistance towards aqueous systems, including alkaline detergents and soaps, can be prepared by employing certain basic nitrogen-containing polymers of styrene-maleic anhydride as the primary emulsifying agent and protective colloid for the emulsion polymerization. Since these nitrogen-containing styrene-maleic anhydride polymers are insoluble or only slightly soluble in water or aqueous alkaline media the emulsion polymers prepared through their use provide films and coatings of extremely outstanding hydrolytic stability but, nevertheless, still retain the desirable feature of removability in acidic media, e.g., inorganic or organic acids.

A further improvement of the present invention is that "acid sensitive" polymers can be prepared without the use of expensive, nitrogen-containing, polymerizable monomers such as the dialkylaminoalkyl methacrylates and the other systems described above. Conventional monomers such as styrene, ethyl acrylate, butyl acrylate, methyl methacrylate, dibutyl itaconate, etc., can be monopolymerized or copolymerized in the presence of the nitrogen-containing styrene-maleic anhydride resins of the present invention to afford "acid sensitive" coatings.

The basic nitrogen-containing polymer of styrene-maleic anhydride of the present invention is the reaction product of the polymer resin of styrene and maleic anhydride with an amine selected from the group consisting of a monoamine and a polyamine or both in a mole ratio of about 0.1 to 2 moles, preferably 0.2 to 1 mole, of total amine per anhydride group per mole of the styrene-maleic anhydride polymer. When mixtures of the monoamine and the polyamine are utilized or each of the amines reacted separately with the styrene-maleic anhydride copolymer, it is preferred that the mole ratio of monoamine to polyamine employed be about 0.1 to 10:1, more preferably about 0.1 to 1:1.

Monoamines that can be used as reactants include those having the following formula:

wherein R is a monovalent hydrocarbon radical, of up to 1000 carbon atoms, preferably alkyl, including cycloalkyl, and R' is hydrogen or R. R preferably has about 5 to 25 carbon atoms and advantageously, at least one R has at least 5 carbon atoms. R can be saturated or unsaturated, aliphatic or aromatic and is preferably saturated. R or R' can be substituted with groups which do not interfere with the reaction of the amino group. The preferred monoamines are the primary amines. Examples of suitable monoamines are amylamine, 2-ethylhexyl amine, N-octyl amine, decyl amine, lauryl amine, stearyl amine, N-methylstearyl amine, N-butyllauryl amine, 2-phenyldecyl amine, diethanolamine, triethanolamine, etc.

Suitable polyamines of the invention include those represented by the following general structure:

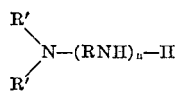

wherein R is an alkylene radical of about 2 to 25, preferably 2 to about 7 carbon atoms, $n$ is a number from 1 to 10,000 more commonly 2 to 10, and R' is hydrogen or a monovalent hydrocarbon radical, such as alkyl, including cycloalkyl, of 1 to about 30 carbon atoms. Both R and R' can be substituted with functional groups such as keto, carboxyl, aldehyde, nitrile, nitro and like groups.

These polyamines include monoalkylene diamines, dialkylaminoalkylamines and the polyalkylenepolyamines. Illustrative of suitable monoalkylene diamines are ethylene diamine, propylene diamine, butylene diamine, octylene diamine, etc. Examples of suitable dialkylaminoalkylamines are dimethylaminomethylamine, dimethylaminoethylamine, dimethylaminopropylamine, dimethylaminobutylamine, diethylaminopropylamine, methylpropylaminoamylamine, propylbutylaminoethylamine, etc. Non-limiting examples of the polyalkylenepolyamine reactants are diethylenetriamine; triethylenetetramine; tetraethylenepentamine; polyethyleneamine; di-(methylethylene) triamine; hexylpropyleneheptamine; tri-(ethylethylene) tetramine; penta-(1-methylpropylene)-hexamine; tetrabutylenepentamine; etc.

The reaction product of the invention can be prepared by simply heating at elevated temperature the polyamine and/or monoamine with the styrene-maleic anhydride polymer. A temperature of at least about 125° C., is usually necessary to effect the reaction and temperatures beyond about 350° C., are generally not utilized in that they may cause undesirable side reactions or degradation of the product. The preferred reaction temperatures are about 190 to 280° C. The reaction may be carried out in bulk or in the presence of a suitable mutual solvent for the reactants. Although the monoamine and polyamine can be combined and reacted simultaneously with the styrene-maleic anhydride polymer, it is preferred to react one with the copolymer until the reaction is substantially complete and then the other, preferably by dropwise addition. The total reaction time will vary depending upon the particular reactants employed but will usually range from about 1 to 5 hours up to several days if necessary.

Illustrative of the types of reaction products that can be employed as the primary emulsifier in the emulsion polymerization process of the invention are the following:

Type I

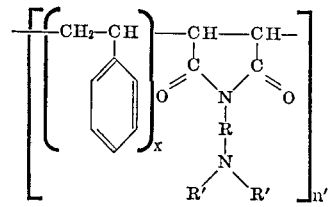

Type II

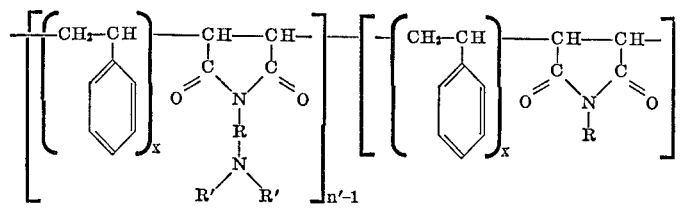

Type III

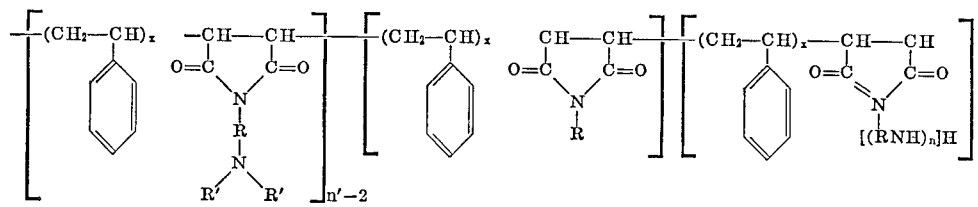

Type IV

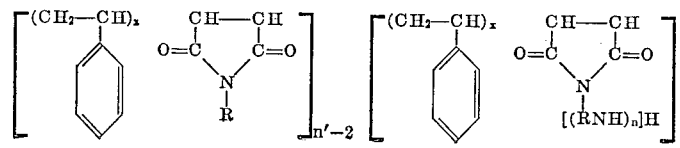

In each of the above structures $x$ is 1 to 4; $n'$ is 2 to 1,000 and R, R', and $n$ have the value assigned above in the description of the amine reactants. Compounds of Type I above can be prepared by the reaction of styrene-maleic anhydride polymers with amines such as dimethylaminopropylamine, diethylaminopropylamine and tertiarybutylaminoethylamine. Typical physical properties of a reaction product prepared by reacting a polymer of styrene and maleic anhydride (3:1 mole ratio) having a molecular weight in the range of about 1800 to 2050 with dimethylaminopropylamine in a mole ratio of 1 to 5 are as follows:

| Form: | Powder |
|---|---|
| Molecular weight | 2000 |
| Melting range, ° C. | 95–100 |
| Acid number | 0 |
| Kinematic viscosity, centistokes in benzene (10% wt./vol.) at 30° C. | 1.2 |
| Kinematic viscosity, centistokes in 10% acetic acid at 30° C. | 1.5 |

Compounds of Type II are very similar to Type I, but generally contain a lesser amount of basic nitrogen. They are made by reacting any of the aforementioned styrene-maleic anhydride resins with mixtures of monofunctional and difunctional amines such as mixture of dimethylaminopropyl amine and n-butyl amine. Another example would be the product formed by reacting a styrene-maleic anhydride resin with diethylaminopropylamine and n-hexylamine.

Compounds of Type III are prepared by reacting any of the aforementioned styrene-maleic anhydride resins with a combination of three different types of amines, for instance a dialkylaminoalkylamine (or tertiary alkylaminoalkylamine), a monoalkyl amine, and a polyalkylene polyamine. Thus, a typical product may be prepared by reacting a styrene-maleic anhydride resin with dimethylaminopropylamine, n-butyl amine and diethylenetriamine.

Compounds of Type IV are prepared by reacting any of the aforementioned styrene-maleic anhydride resins with a combination of two amines, namely a primary monoamine and polyalkylene polyamine. Thus, a typical product may be prepared by reacting a styrene-maleic anhydride resin with n-butyl amine and diethylenetriamine.

It can be readily seen that a very wide spectrum of amines can be employed to prepare the emulsifiers and protective colloids of the present invention. Generally, any combination of amines may be employed, so long as the product shows emusifying and protective colloid properties, and is soluble in aqueous dilute organic acids.

The copolymer resin of styrene and maleic anhydride with which the monoamine and/or polyamines are reacted are resinous copolymers having about 1 to 4 moles, preferably 1 to 3 moles of styrene per mole of maleic anhydride. The copolymer contains repeating styrene-maleic anhydride units and has an average molecular weight of at least about 400 up to about 100,000, preferably about 400 to 10,000. The melting points of the lower molecular weight copolymers will generally range from about 80 to 300° C., as determined by the Fisher-Johns melting point apparatus. The determination of average molecular weight as used herein is made by the thermoelectric differential vapor pressure lowering method on a microlab osmometer.

The copolymer of styrene and maleic anhydride can be prepared by known methods. A preferred method is solution polymerization where the monomers are polymerized in a suitable solvent employing as a polymerization catalyst a free-radical peroxide catalyst, preferably benzoyl peroxide or dicumyl peroxide, at a temperature of about 75 to 300° C., or more. Suitable solvents include the aromatic hydrocarbon solvents, such as cumene, p-cymene, xylene, toluene, etc. The aromatic solvents may be chain-terminating and give lower molecular weight products. Other suitable solvents are the ketones, such as methylethylketone, which may also be chain-terminating solvents. The preferred manner of carrying out the polymerization is by what is known in the art as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization, the formation of the polymers causes a heterogeneous system, the polymer layer being the heavier layer and recoverable by merely decanting the upper aromatic solvent layer and drying. On the other hand, when a ketone is the solvent, the formed polymer is usually soluble in the solvent media so that recovery of the products necessitates a solvent-stripping operation.

The emulsion polymerization systems in which the basic nitrogen-containing polymer of the invention is used as the emulsifier are those systems wherein polymerization of polymerizable monomers is affected in the presence of an emulsion polymerization catalyst, emulsifier and water. Any polymerizable vinyl monomer which is chemically stable under the conditions employed for polymerizations can be used. By vinyl monomer is meant a compound having a terminal ethylenic group ($CH_2C=<$) and includes styrene; alpha-, ortho-, meta- and para-methylstyrenes; the divinylbenzenes; the acrylic type acids, nitriles, amides and esters; the allylic-type carboxylic esters and alcohols; the monovinylpyridines; and N-vinyl-pyrollidone; the vinyl esters of halogen acids or of carboxylic acids; vinyl chloride; the alkyl vinyl ketones; the olefin and diolefin hydrocarbons of 2 to 15 carbon atoms containing a terminal methylene group as, for instance, isobutene, diisobutylene, octene, butadiene, isoprene and the like.

The acrylic type compounds may have the structure:

wherein Q is hydrogen, methyl or halide, R is a hydrocarbon radical, preferably alkyl of 1 to 4 carbon atoms, and Z is selected from —CN, —COOR and

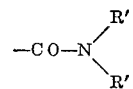

wherein R' is hydrogen, alkyl, alkenyl, cycloalkyl, aralkyl or aryl. The most important monomers of this type are acrylonitrile, the lower alkyl acrylates, including the lower alkyl methacrylates.

Allylic-type esters and alcohols include those having the structure:

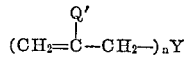

wherein Q' is hydrogen, methyl, halide and

$n$ is a number of 1–2 and Y is hydroxy or

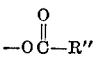

when $n$ is 1, and when $n$ is 2, Y is the diacid residue of a dibasic acid. R'' in the radical

is an alkyl, alkenyl, cycloalkyl, aryl, or aralkyl group, usually of 2 to 18 carbon atoms. Important monomers are dimethallyl succinate, allyl acetate, diallyl phthalate and dimethyl itaconate. The usable monovinylpyridines are the unsubstituted vinylpyridines, viz., the 2,3 and 4-vinylpyridines; and the alkyl-substituted vinylpyridines, e.g., 2-methyl-5-vinylpyridine, 5-ethyl-2-vinylpyridine, 2-methyl-5-vinylpyridine, 5-ethyl-2-vinylpyridine-2-methyl-6-vinylpyridine and 2-ethyl-4-vinylpyridine. The vinyl esters have the structure $CH_2=CH-A$, where A is a chlorine or acyloxy radical. The most important monomers of this group are vinyl chloride and vinyl acetate.

The polymers prepared can be monopolymers, copolymers or terpolymers of 3 or more vinyl compounds. In preparing copolymers it is preferable to select those materials which show a favorable copolymerization reactivity. However, in many instances monomers which fail to copolymerize can, nevertheless, be converted into an emulsion of mixed polymers which is extremely stable and of small particle size. For example, the present invention can be employed to prepare emulsions from a mixture of styrene and vinyl acetate, although it is well known that these monomers do not undergo extensive copolymerization.

The polymerization catalyst commonly employed in emulsion polymerizations are materials which are capable of liberating free radicals under the conditions employed for polymerization. Typical catalysts which may be employed are potassium persulfate, sodium persulfate, ammonium persulfate, hydrogen peroxide, tertiary butyl hydroperoxide, cumene hydroperoxide, benzoyl peroxide, azobisisobutyronitrile, lauroyl peroxide, isopropyl peroxydicarbonate, tertiarybutyl-peroxypivalate and the like. Redox catalysts may also be employed, especially when polymerization is carried out at lower temperatures. Typical redox catalysts which can be used are the persulfate bisulfite systems such as potassium persulfate-sodium bisulfite, tertiary butyl hydroperoxide-sodium formaldehyde sulfoxylate, as well as other redox systems which are known in the art.

The polymerization temperature is usually a function of the catalyst or catalyst system employed in the preparation of the polymer emulsions. The usual operating range is about 40°–80° C., although it is possible to operate in the range of about 0° C. to 100° C. The polymerization can be carried out at atmospheric pressure or autogeneous pressure, although superatmospheric pressure may be required if it is desired to liquify gaseous monomers.

The amount of the nitrogen-containing styrene-maleic anhydride emulsifier employed in the emulsion polymerization of the invention will vary depending upon the particular monomer or monomers and the catalyst selected but ordinarily will fall in the range of 0.1 to 50% by weight, preferably 2 to 20% by weight based on the monomers. In many cases it is desirable to add accessory emulsifiers or protective colloids to the styrene-maleic anhydride amine reaction products of the present invention. The type of accessory emulsifier may vary widely and includes most of the commercially available cationic, non-ionic and anionic materials. The accessory emulsifiers include the anionic type such as sodium bis(tridecyl) sulfosuccinate. Other useful types are the products obtained by oxyalkylation of substituted phenols, e.g., the condensation products of ethylene oxide with octyl and nonyl phenols. When employed, the accessory emulsifiers are usually present in an amount of about 0.1 to 5% by weight, based on the monomers. Protective colloids which can be employed are carboxymethyl cellulose, hydroxyethyl-cellulose and related materials. Usually, however, the styrene-maleic anhydride resin derivatives of the present process have sufficient protective colloid activity to eliminate the need for other materials.

Many techniques may be employed for preparing emulsions using the "acid sensitive" styrene-maleic anhydride resins of the present invention as protective colloids and emulsifying agents. When preparing a large number of polymer emulsions on a small scale it is convenient to conduct the polymerization reactions in pressure bottles which are charged with the ingredients of the polymerization recipe and heated in a thermostated, rotating water bath for extended time intervals. When conducting the polymerization in pressure bottles, the ingredients of the aqueous and nonaqueous charge are mixed instantaneously in the pressure bottle which is sealed under nitrogen, capped and placed in the polymerization bath. In preparing the "acid sensitive" emulsions of the present invention with the nitrogen derivatives of styrene-maleic anhydride resins, the resin is first solubilized in aqueous acetic acid or other organic acid. The accessory emulsifiers, protective colloids and catalysts are then added, followed by instantaneous or incremental addition of the monomer or monomer mixture. When conducting larger scale reactions, the polymerization emulsions can be prepared using a batch process or continuous process. The batch reactions can be conducted by methods comprising (1) instantaneous monomer addition to the non-aqueous charge; (2) incremental monomer addition with some initial pre-mixing of monomer and aqueous charge; (3) incremental monomer addition with no pre-mixing of aqueous and non-aqueous charge, and (4) emulsion addition technique in which aqueous and non-aqueous charge are pre-emulsified and added incrementally to the batch reactor.

In continuous polymerization operations the aqueous and non-aqueous charge can be added separately and incrementally (by means of a metering pump or other suitable metering device) to the polymerization reactor while polymer emulsion is removed continuously. In some cases the aqueous and non-aqueous charge, including or excluding the catalysts, are pre-emulsified and added continuously to the reactor, during which time initiator may also be fed to the reactor from a separate metering system.

Residence times in batch or continuous reactors are usually in the order of one hour to twenty-four hours depending on polymerization temperature, monomer structures, monomer concentration, catalyst concentration, emulsifier concentration and other factors usually associated with rates of polymerization reactions in emulsion systems.

The following examples are included to illustrate typical applications of the present invention but are not included to limit the scope of the invention.

EXAMPLE I

A styrene homopolymer latex was prepared using the following recipe:

| | Parts by weight |
|---|---|
| Water (deionized) and reaction product A | 208 |
| Styrene (washed free of inhibitor with caustic and distilled water) | 98.5 |
| Methacrylic acid | 1.5 |
| Sodium bis(tridecyl)sulfosuccinate | 0.5 |
| Potassium persulfate | 0.6 |
| Sodium bisulfite | 0.4 |
| Adjust pH to | 4–5 |

Reaction product A is the reaction product of dimethylaminopropylamine and a styrene maleic anhydride polymer resin having an average molecular weight of approximately 2000 and a styrene maleic anhydride ratio of 3:1. The mole ratio of dimethylpropylamine to the styrene maleic anhydride resin is 5:1. Fifteen parts of reaction product A was solubilized in about 200 parts of water at a pH 4.5. Acetic acid was employed to adjust the pH. Approximately 6–7 ml. of glacial acetic acid was required per 15 parts of the styrene maleic anhydride resin in 200 parts of water. The solution was stirred and heated at 30–50° C., for about 30 minutes or until the resin was dissolved. The solution was filtered to remove any insoluble matter.

The polymerization reaction was carried out in a three-necked reaction flask, equipped with stirrer, thermometer, condenser, dropping funnel and nitrogen inlet tube. The flask was heated in an oil bath or by other suitable heating methods. Nitrogen was swept slowly through the system throughout the course of the reaction.

The ingredients of the aqueous charge, except the potassium persulfate and the sodium bisulfite were added in the order listed above and the system was heated to 50° C., while purging with nitrogen. The monomer charge was added with sufficient stirring to complete emulsification of the reaction mixture. The monomer addition was made over a 10–15 minute period and the potassium persulfate-sodium bisulfite catalyst added. The mixture was heated an additional four hours at 50° C. The conversion of monomer to polymer was quantitative. The resulting emulsion showed very small particle size (less than 0.5 microns), good storage and freeze-thaw stability. Floor polishes formulated from the above emulsions showed outstanding resistance to water spotting and alkali spotting, but could be removed with organic acids.

EXAMPLE II

A styrene-acrylic copolymer latex was prepared using the following formulation:

| | Parts by weight |
|---|---|
| Water (distilled) | 208 |
| Styrene | 88.5 |
| Ethyl acrylate | 10 |
| Methacrylic acid | 1.5 |
| Reaction product A [1] | 15 |
| Sodium bis(tridecyl)sulfosuccinate | 0.5 |
| Potassium persulfate | 0.6 |
| Sodium bisulfite | 0.4 |

[1] See Example I.

Three different methods were employed to illustrate the effect of monomer addition techniques on emulsion stability and particle size.

(1) Instantaneous monomor addition.—The ingredients of the aqueous charge and nonaqueous charge (i.e., the monomers) were added to the resin kettle and the temperature of the reaction mixture brought up to 50° C. As soon as the temperature of the bath approached 50° C., an exothermic reaction took place and the temperature rose to 65° C. The bath was cooled to 50° C., in about 15 minutes and the reaction was continued at 50° C., for about four hours. There was some prefloc formation during polymerization and the reaction mixture was filtered. There was a slight separation of granular particles after the emulsion stood for several weeks. The conversion of monomers to polymer in the emulsion was quantitative. The emulsions showed a Brookfield Viscosity of 9.0 centipoise at 30° C.

(2) Incremental monomer addition technique.—Two methods were employed using the monomer addition technique (a) and (b). In method (a) there was no pre-mixing of monomer and aqueous charge prior to adding the remainder of the monomer charge incrementally. In method (b) a portion of the monomer of aqueous charge was pre-mixed prior to adding the remaining monomer incrementally.

(a) Incremental addition with no pre-mixing.—The ingredients of the aqueous charge were added to the resin kettle, which was brought to a temperature of 50° C. The monomer charge was then added over a period of one hour and the reaction continued for an additional four hours after the monomer addition was completed. The conversion to polymer was quantitative. The emulsion showed a Brookfield viscosity of 10 centipoise at 30° C. There was little or no prefloc formation during polymerization and some separation of particles occurred upon standing for several weeks.

(b) Incremental addition with partial monomer pre-mixing.—The ingredients of the aqueous charge and 1/10 of the total monomer mixture were pre-mixed and brought to 50° C., with good agitation. The remaining monomer charge was added over a period of one hour and the reaction mixture heated for an additional four hours after monomer addition was completed. The conversion of monomer to polymer was 99 percent of the theoretical value. The emulsion had a "blue cast" and had very small particle size, e.g., 0.05–0.1 microns. The Brookfield Viscosity of the resulting emulsion was 19.1 centipoise at 30° C. Coatings such as floor polishes prepared from the above emulsion showed extremely good gloss, freeze-thaw stability and resistance to water and alkaline materials. The coatings were removable with organic acids.

(3) Emulsion addition technique.— The ingredients of the aqueous and non aqueous charge were mixed in a Waring Blender. One-half of the charge was placed in the resin kettle and heated to 50° C., and the remaining emulsified mixture added incrementally over a period of one hour. The mixture was heated for an additional four hours. No prefloc formation was observed during polymerization. The conversion to polymer was 100%. The emulsion had a small particle size and showed no separation of particles upon standing at room temperature for several weeks. The emulsion had a Brookfield Viscosity of 12.5 centipoise at 30° C.

Polymer emulsions prepared in pressure bottles by instantaneous addition and emulsification of monomers and aqueous charge at 50° C., corresponded closely in properties to the batch emulsion addition technique (3).

EXAMPLE III

A number of emulsion polymerizations were conducted employing the nitrogen-containing styrene-maleic polymers of the present invention as the primary emulsifier. In the polymerization, the ingredients of the aqueous charge were prepared as in Example I above and the monomer or monomer mixture were placed into pressure bottles (which were first flushed with nitrogen) and placed in a rotating polymerization bath. The monomer or monomer mixtures polymerized, the primary and accessory surfactants used, the polymerization conditions and results are also shown in the table below.

The emulsions produced were found to be very stable as shown by the fact that all of the emulsions were stable for at least one week. The emulsion stabilities were rated according to the procedure established by G. Greth and J. E. Wilson, J. App. Poly, Sci. 5, 135–148 which is as follows.

Rating: Definition
0 _____ Lumps formed within half hour after start of polymerization
1 _____ Lumps formed within one hour after start of polymerization
2 _____ Lumps formed within two hours after start of polymerization
3 _____ Excessive prefloc formation
4 _____ Prefloc formation
5 _____ Very little prefloc formation
6 _____ Stable for less than one day
7 _____ Stable for one day
8 _____ Stable for three days
9 _____ Stable for one week
10 _____ Stable for more than one week

TABLE I

| Run | Stability Rating | Monomers | Ratio [6] |
|---|---|---|---|
| 1 | 10 | Styrene | 100 |
| 2 | 10 | ...do... | 100 |
| 3 | 10 | ...do... | 100 |
| 4 | 9 | Styrene-Methacrylic Acid | 98/2 |
| 5 | 10 | ...do... | 95/5 |
| 6 | 10 | Styrene-Ethylacrylate | 90/10 |
| 7 | 10 | Styrene-E. Acryl-MAA [3] | 85/10/5 |
| 8 | 10 | Styrene-E. Acryl-MAA [3] | 69/30/1 |
| 9 | 10 | Styrene-E. Acryl-MAA [3] | 68/30/2 |
| 10 | 10 | Styrene-E. Acryl-MAA [3] | 67/30/3 |
| 11 | 10 | Styrene-E. Acrylate | 60/40 |
| 12 | 10 | Styrene-E. Acryl-MAA | 49/50/1 |
| 13 | 10 | Styrene-Vinylidene Chloride | 90/10 |
| 14 | 10 | ...do... | 80/20 |
| 15 | 10 | Styrene-Butadiene | 90/10 |
| 16 | 10 | ...do... | 80/20 |
| 17 | 10 | Styrene-Vinyl Chloride | 90/10 |
| 18 | 10 | ...do... | 80/20 |
| 19 | 10 | Styrene-Methyl Metacry | 90/10 |
| 20 | 10 | Styrene-Methyl Acrylate | 90/10 |
| 21 | 10 | Styrene-Vinyl Acetate | 90/10 |
| 22 | 10 | Styrene-Butyl Methacryl | 90/10 |
| 23 | 10 | Styrene-2-Ethyl-Hexyl-Acry | 90/10 |
| 24 | 10 | Styrene-Vinyl Methyl Ether | 90/10 |
| 25 | 10 | Vinyl Chloride-Vinylidene CHL | 80/20 |
| 26 | 10 | Vinyl Chloride | 100 |
| 27 | 10 | Styrene | 100 |
| 28 | 10 | ...do... | 100 |

| Run | Initiator | Primary Emulsifier | Accessory Surfactants |
|---|---|---|---|
| 1 | KP-Na-Bisulfite [2] | Reaction Product A of Example I in acetic acid | Sodium bis (tridecyl) sulfosuccinate. |
| 2 | KP-Na-Bisulfite | do | Do. |
| 3 | do | do | Do. |
| 4 | do | do | Do. |
| 5 | do | do | Do. |
| 6 | do | do | Do. |
| 7 | do | do | D9. |
| 8 | do | do | Do. |
| 9 | do | do | Do. |
| 10 | do | do | Do. |
| 11 | do | do | Do. |
| 12 | do | do | Do. |
| 13 | do | do | Do. |
| 14 | do | do | Do. |
| 15 | do | do | Do. |
| 16 | do | do | Do. |
| 17 | do | do | Do. |
| 18 | do | do | Do. |
| 19 | do | do | Do. |
| 20 | do | do | Do. |
| 21 | do | do | Do. |
| 22 | do | do | Do. |
| 23 | do | do | Do. |
| 24 | do | do | Do. |
| 25 | do | do | Do. |
| 26 | do | do | Do. |
| 27 | do | Reaction Product B in acetic acid [4] | Ig CO-630 and CO-990.[1] |
| 28 | do | Reaction Product C in acetic acid [5] | Ig CO-630 and CO-990. |

BASED ON TOTAL EMULSION

| Run | Monomer Percent | Primary Emuls. | Access. Emuls. | Percent Solids | Percent Conv. | Reaction Temp., °C. | Intrinsic Viscosity |
|---|---|---|---|---|---|---|---|
| 1 | 30.2 | 4.5 | 0.33 | 35.0 | 100 | 50 | |
| 2 | 30.2 | 4.5 | 0.17 | 35.0 | 100 | 50 | |
| 3 | 30.2 | 4.5 | 0.06 | 35.0 | 100 | 50 | |
| 4 | 29.5-0.5 | 4.5 | 0.17 | 35.0 | 100 | 50 | |
| 5 | 28.5-1.5 | 4.5 | 0.17 | 35.0 | 100 | 50 | -1.40 |
| 6 | 27.3-3.0 | 4.5 | 0.17 | 35.0 | 100 | 50 | |
| 7 | 25.8-3.0-1.5 | 4.5 | 0.17 | 35.4 | 100 | 50 | -2.50 |
| 8 | 20.75-9.0-0.25 | 4.5 | 0.17 | 35.4 | 100 | 50 | -3.29 |
| 9 | 20.5-9.0-0.5 | 4.5 | 0.17 | 35.4 | 100 | 50 | -3.15 |
| 10 | 20.0-9.0-1.0 | 4.5 | 0.17 | 35.4 | 100 | 50 | -2.87 |
| 11 | 18.0-12.0 | 4.5 | 0.17 | 35.4 | 100 | 50 | -3.30 |
| 12 | 14.75-15-0.25 | 4.5 | 0.17 | 35.4 | 100 | 50 | -3.61 |
| 13 | 27.3-3.0 | 4.5 | 0.17 | 35.4 | 100 | 50 | |
| 14 | 24.0-6.0 | 4.5 | 0.17 | 35.4 | 100 | 50 | |
| 15 | 27.3-3.0 | 4.5 | 0.17 | 35.4 | 100 | 50 | |
| 16 | 24.0-6.0 | 4.5 | 0.17 | 35.4 | 100 | 50 | |
| 17 | 27.3-3.0 | 4.5 | 0.17 | 35.4 | 100 | 50 | |
| 18 | 24.0-6.0 | 4.5 | 0.17 | 35.4 | 100 | 50 | |
| 19 | 27.3-3.0 | 4.5 | 0.17 | 35.4 | 100 | 50 | |
| 20 | 27.3-3.0 | 4.5 | 0.17 | 35.4 | 100 | 50 | |
| 21 | 27.3-3.0 | 4.5 | 0.17 | 35.4 | 100 | 50 | |
| 22 | 27.3-3.0 | 4.5 | 0.17 | 35.4 | 100 | 50 | |
| 23 | 27.3-3.0 | 4.5 | 0.17 | 35.4 | 100 | 50 | |
| 24 | 27.3-3.0 | 4.5 | 0.17 | 35.4 | 100 | 50 | |
| 25 | 24.0-6.0 | 4.5 | 0.17 | 35.4 | 100 | 50 | |
| 26 | 30.0 | 4.5 | 0.17 | 35.4 | | 50 | |
| 27 | 30.0 | 4.5 | 1.0 | 35.4 | | 50 | |
| 28 | 30.0 | 4.5 | 2.0 | 35.4 | | 50 | |

[1] Ig CO-630 and CO-990 are oxyethylated nonylphenols.
[2] KP-Na Bisulfite=Potassium persulfate-Sodium bisulfite.
[3] MAA=Methacrylic Acid.
[4] A styrene-maleic anhydride copolymer resin (1 to 1 mole ratio) having a molecular weight of 400 to 600, condensed with a fatty aminoamine mixture having on the average 12 carbon atoms, N.N., dimethylaminopropylamine acid and ethanolamine in mole ratio 1.0 to 0.17 to 0.51 to 0.31.
[5] A styrene-maleic anhydride copolymer resin (1 to 1 mole ratio) having a molecular weight of 400 to 600.
[6] Calculated from percent monomers.

It is claimed:
1. In the emulsion polymerization of polymerizable vinyl monomers in the presence of an emulsion polymerization catalyst, emulsifier and water at temperatures of about 0 to 100° C., the improvement which comprises employing as the emulsifier in said polymerization under acidic pH, the reaction product of a polymer of styrene and maleic anhydride having a styrene to maleic anhydride-mole ratio of about 1 to 4:1 and an average molecular weight of at least about 400 and from about 0.1 to 2 moles of an amine per anhydride group in said styrene-maleic anhydride polymer, said amine being selected from the group consisting of, (A) Monoamine having the general formula:

wherein R is alkyl of about 5 to 25 carbon atoms and R' is selected from the group consisting of hydrogen and R, and (B) Polyamine having the general formula:

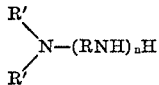

wherein R is alkylene of 2 to about 25 carbon atoms, $n$ is a number from 1 to about 10,000 and R' is selected from the group consisting of hydrogen and hydrocarbon of 1 to about 30 carbon atoms, said emulsifier being present in an amount of about 0.1 to 50 weight percent based on the vinyl monomers.

2. The improvement of claim 1 wherein the amine is a polyamine having the general formula:

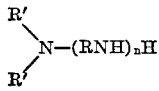

wherein R is alkylene of 2 to about 7 carbon atoms, $n$ is a number from 2 to about 10, and R' is selected from the group consisting of hydrogen and alkyl of 1 to about 7 carbon atoms.

3. The improvement of claim 1 wherein the amine is a monoamine having the general formula:

wherein R is alkyl of 5 to 25 carbon atoms and R' is selected from the group consisting of hydrogen and R.

4. The improvement of claim 1 wherein the amine reactant is a mixture of the polyamine of claim 2 and the monoamine of claim 3 in a mole ratio of monoamine to polyamine of about 0.1 to 1:1.

5. The improvement of claim 1 wherein the polymer of styrene and maleic anhydride has an average molecular weight of about 400 to 10,000.

6. The improvement of claim 1 wherein the amount of said emulsifier is about 2 to 20% by weight based on the monomers.

7. In the emulsion polymerization of styrene in the presence of an emulsion polymerization catalyst, emulsifier and water at a temperature of about 40 to 80° C., the improvement which comprises employing as the primary emulsifier in said polymerization under acidic pH, the reaction product of a polymer of styrene and maleic anhydride having a styrene to maleic anhydride mole ratio of about 1 to 4:1 and an average molecular weight of at least about 400 and from about 0.1 to 2 moles of an amine per anhydride group in said styrene-maleic anhydride polymer, said amine being selected from the group consisting of, (A) Monoamine having the general formula:

wherein R is alkyl of about 5 to 25 carbon atoms and R' is selected from the group consisting of hydrogen and R, and (B) Polyamine having the general formula:

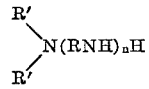

wherein R is alkylene of 2 to about 25 carbon atoms, $n$ is a number from 1 to about 10,000 and R' is selected from the group consisting of hydrogen and hydrocarbon of 1 to about 30 carbon atoms, said emulsifier being present in an amount of about 0.1 to 50 weight percent based on the styrene.

8. The improvement of claim 7 wherein the polymer of styrene and maleic anhydride has an average molecular weight of about 400 to 10,000.

9. The improvement of claim 7 wherein the polymer of styrene and maleic anhydride has an average molecular weight of about 400 to 10,000.

10. In the emulsion copolymerization of styrene and a lower alkyl acrylate in the presence of an emulsion polymerization catalyst, emulsifier and water at a temperature of about 40 to 80° C., the improvement which comprises employing as the primary emulsifier in said polymerization under acidic pH, the reaction product of a polymer of styrene and maleic anhydride having a styrene to maleic anhydride mole ratio of about 1 to 4:1 and an average molecular weight of at least about 400 and from about 0.1 to 2 moles of an amine per anhydride group in said styrene-maleic anhydride polymer, said amine being selected from the group consisting of, (A) Monoamine having the general formula:

wherein R is alkyl of about 5 to 25 carbon atoms and R' is selected from the group consisting of hydrogen and R, and (B) Polyamine having the general formula:

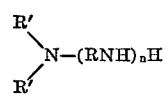

wherein R is alkylene of 2 to about 25 carbon atoms, $n$ is a number from 1 to about 10,000 and R' is selected from the group consisting of hydrogen and hydrocarbon of 1 to about 30 carbon atoms, said emulsifier being present in an amount of about 0.1 to 50 weight percent based on the styrene and lower alkyl acrylate.

References Cited

UNITED STATES PATENTS

| | | | |
|---|---|---|---|
| 2,979,491 | 4/1961 | Piloni | 260—92.8 |
| 2,987,493 | 6/1961 | Grady et al. | 260—29.6 |
| 3,186,975 | 6/1965 | Harris | 260—93.5 |

JOSEPH L. SCHOFER, *Primary Examiner.*

J. C. HAIGHT, *Assistant Examiner.*

U.S. Cl. X.R.

260—63, 78.5, 80, 80.8, 85.1, 87.3, 87.7, 88.1, 88.3, 88.7, 89.5, 89.7, 91.3, 92.8, 93.5, 93.7, 94.2, 94.8

UNITED STATES PATENT OFFICE
CERTIFICATE OF CORRECTION

Patent No. 3,444,151　　　　　　　　Dated May 30, 1969

Inventor(s)　Joseph A. Verdol and Hector J. Gonzalez

It is certified that error appears in the above-identified patent and that said Letters Patent are hereby corrected as shown below:

Column 6, line 29, "$(CH_2C=\!\!<)$" should be --$(CH_2=C\!\!<)$--.

Column 14, the first formula in that column reading:

should read:　　$R-N-H$ with $R'$ above $N$

Column 14, line 22, in claim 9, "The improvement of claim 7" should be --The improvement of claim 10--.

SIGNED AND
SEALED
MAR 17 1970

(SEAL)
Attest:

Edward M. Fletcher, Jr.
Attesting Officer

WILLIAM E. SCHUYLER, JR.
Commissioner of Patents